United States Patent [19]

Scheffler

[11] Patent Number: 5,122,631
[45] Date of Patent: Jun. 16, 1992

[54] ELECTRODE HOLDER FOR AIR ARC GOUGING TORCH

[76] Inventor: Otto G. Scheffler, Box 584, 150 Mile House, British Columbia, Canada, V0K 2G0

[21] Appl. No.: 720,361

[22] Filed: Jun. 25, 1991

[51] Int. Cl.⁵ .............................................. B23K 9/173
[52] U.S. Cl. ...................................................... 219/70
[58] Field of Search ............................ 219/70, 69.1, 74

[56] References Cited

U.S. PATENT DOCUMENTS

| | | | |
|---|---|---|---|
| 2,726,309 | 12/1955 | Stepath | 219/70 |
| 2,903,554 | 9/1959 | Stepath | 219/69.1 |
| 3,113,201 | 12/1963 | Stepath | 219/70 |
| 3,187,154 | 6/1965 | Stepath | 219/70 |
| 3,436,522 | 4/1969 | Carkhuff et al. | 219/74 |
| 3,566,069 | 2/1971 | Henderson | 219/70 |
| 3,651,302 | 3/1972 | Maddison | 219/70 |
| 4,161,642 | 7/1979 | Arnason | 219/70 |
| 4,218,605 | 8/1980 | Hoffman et al. | 219/70 |
| 5,041,710 | 8/1991 | Hamal | 219/70 |

*Primary Examiner*—Geoffrey S. Evans
*Attorney, Agent, or Firm*—John Russell Uren

[57] ABSTRACT

A holder (10) for an electric arc gouging electrode comprises an elongate body (12) having a front end and a rear end. An electrically conductive tube (14) for receiving an electrode (31) therein is located on the body member (12) and extends longitudinally thereof. An air conduit (28) which is separate from the tube (14) is provided on the body member (12). The air conduit (28) has an air outlet at the front end of the body member (12) and a connector (36) is provided at the rear end of the body member (12) for connecting the air conduit (28) to a source of air under pressure. The holder (10) also includes electrically conductive rod (22) for connecting the electrically conductive tube (14) to a source of electrical power.

6 Claims, 2 Drawing Sheets

5,122,631

ELECTRODE HOLDER FOR AIR ARC GOUGING TORCH

FIELD OF THE INVENTION

This invention relates to an electrode holder for an air arc gouging torch.

BACKGROUND OF THE INVENTION

Air arc gouging or cutting is used in the metal working industry, for example, to remove unwanted surface material or defects from metal bodies. It operates by providing an electric arc between a carbonaceous electrode and a workpiece and directing a stream of high pressure air or other suitable gas along the electrode to remove molten metal created by the arc.

The known electrode holders of this type are bulky and do not fit into corners and other inaccessible places. These holders also end with long air tubes that do not conveniently fit into a tool box, therefore requiring a larger storage area and detracting from the portability of such devices. A further disadvantage of the known devices is that the electrode is exposed, and it is, therefore, subject to breakage when dropped or knocked against a hard surface. The conventional electrode holders further require an air pressure of at least 100 psi in order for them to operate.

It is accordingly an object of the present invention to provide a manually operable tool for gouging and cutting ferrous and non-ferrous metals which overcomes the above-mentioned difficulties.

SUMMARY OF THE INVENTION

According to the invention, there is provided a holder for an electric arc gouging electrode, comprising an elongate body member having a front end and a rear end; an electrically conductive tube for receiving an electrode therein, located on the body member and extending longitudinally of the body member; air conduit means, separate from said tube, on the body member and having an air outlet at the front end of the body member which is offset from the tube and connection means located towards the rear end of the body member for connection of the air conduit means to a source of gas under pressure; and means for connecting the tube to a source of electrical power.

Further objects and advantages of the invention will become apparent from the description of a preferred embodiment of the invention below.

DETAILED DESCRIPTION OF PREFERRED EMBODIMENT

Figure 1:
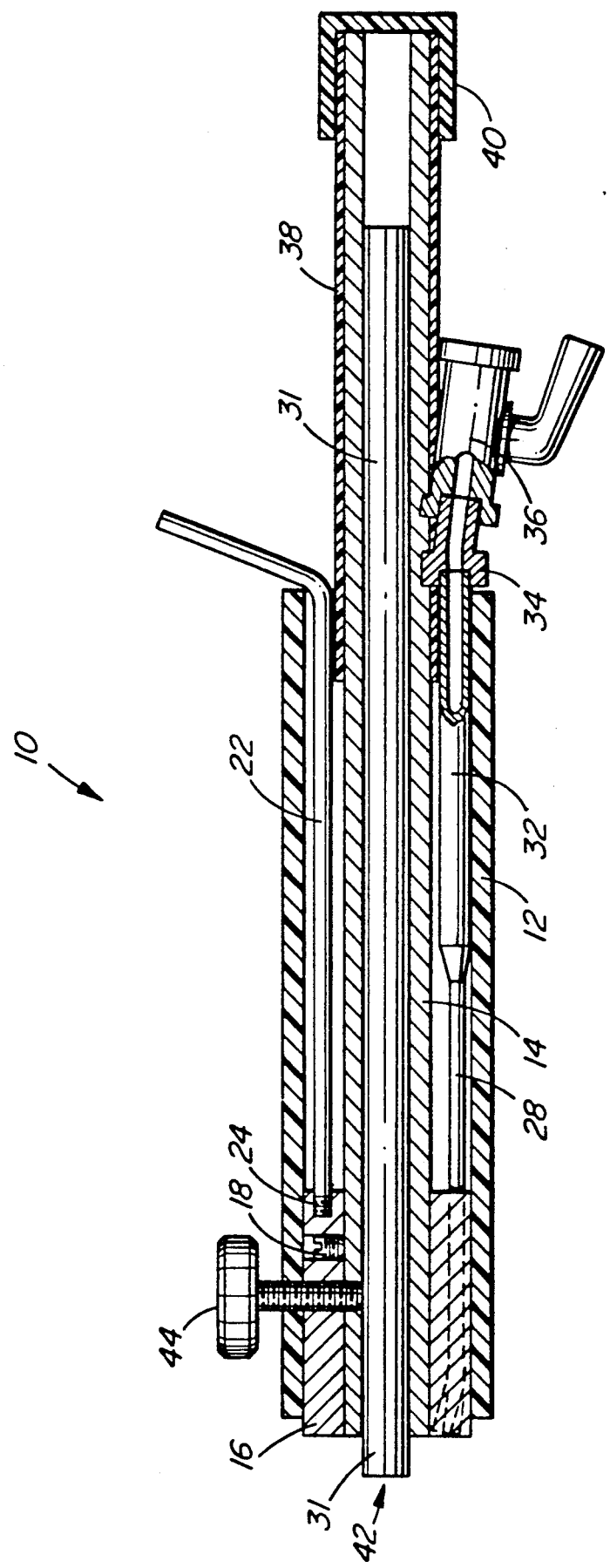
FIG. 1 is a longitudinal section through an electrode holder according to the invention.
Figure 2:
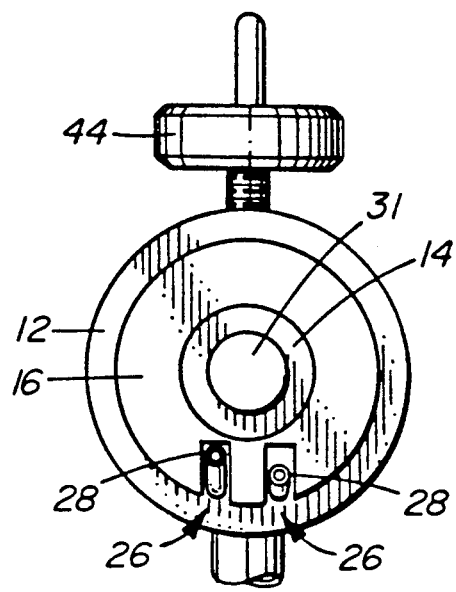
FIG. 2 is a front end view of the electrode holder of FIG. 1.
Figure 3:
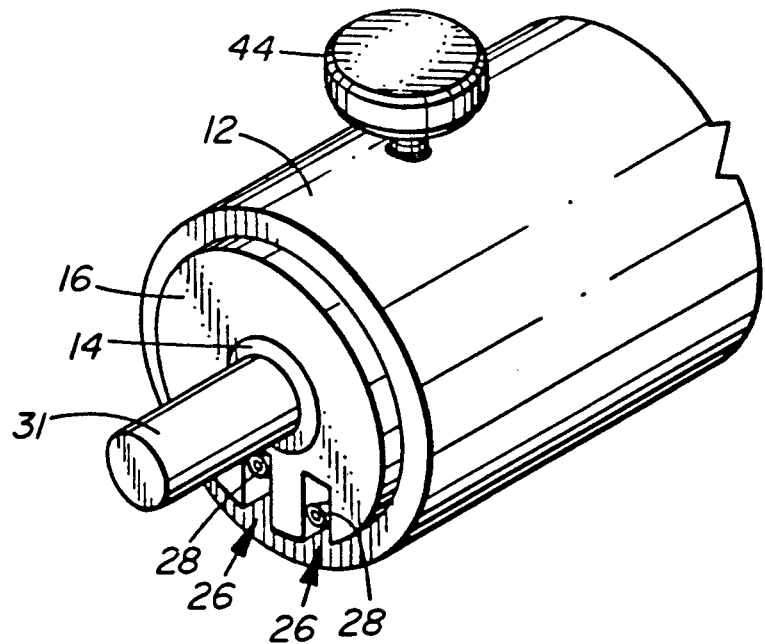
FIG. 3 is a fractional three-dimensional view of the front end of the holder with a partly used electrode in the holder.

In the drawings, reference numeral 10 generally indicates an electrode holder comprising a cylindrical body member 12 and an electrically conductive metal tube 14 positioned coaxially with respect to the body member 12. The tube 14 is held in place by means of an electrically conductive core 16 located at the front end of the body member 12. The core 16 is cylindrical in shape and has a central bore through which the tube 14 is inserted. The external diameter of the tube 14 matches the internal diameter of the central bore in the core 16. Both the core 16 and the tube 14 project slightly from the front end of the body member 12. The tube 14 is held in position in the core 16 by means of a set screw 18.

The body member 12 is of an electrically nonconductive material, such as bakelite. Convenient dimensions for the body member 12 have been found to be 6 inches long, ⅛ inch thick and 1 inch inside diameter. The core 16 and tube 14 protrude by about 1/16 inch at the front end of the body member 12. The body member 12 is fastened to the core 16 by means of screws (not shown). The core 16 is conveniently of aluminum.

A brass rod 22 is connected to the rear of the core 16 by means of a screw-threaded connection 24 and protrudes from the rear end of the body member 12 and is bent upwards at the protruding end to accommodate a welder's stinger (electrode holder).

A pair of longitudinal grooves 26 are cut into the side of the core 16. These grooves are about 1/16 inch apart and run along the full length of the core 16. Each groove 26 houses a copper tube 28. The grooves 26 are cut slightly deeper to allow the copper tubes 28 to be bent upwards at their outlet ends. As shown, the one tube 28 is bent through a greater angle than the other. At their opposite ends, the tubes 28 are connected to a larger diameter pipe 32 which is provided with a coupling member 34 at its rear end. An air valve 36 is fitted to the coupling 34. Any convenient quick coupling connection member (not shown) can be fitted to the air valve 36 to suit a particular pressurized air source. The copper tubes 28 are brazed or silver soldered to the larger diameter pipe 32 and the pipe 32, in turn, is brazed or silver soldered to the connection member 34.

The tube 14 which serves as a protective sheath for an electrode 31 has a length which is substantially longer than the length of the body member 12 so that the tube 14 protrudes at the rear of the body member 12. The protruding part of the tube 14 is covered with an insulating plastic tubing 38 and an end cap 40 of non-conductive material to prevent electric arc formation at the rear end of the tube 14. Because of its length, the tube 14 can accommodate an entire electrode and the electrode is protected during use of the electrode holder 10. The electrode 31 is inserted into the tube 14 so that only a short length protrudes from the front end of the holder, as shown at 42. The electrode is held in position by means of a screw 44 with a knurled knob for easy tightening and fastening. As the electrode 31 is used up, it is advanced along the tube 14. The differing bend angles of the copper tubes 28 at their outlet ends provide a spread of pressurized air which extends the cutting range between electrode adjustments.

By way of example, suitable dimensions for the various components of the electrode holder are summarized below.

(a) Body member 12: approximately 6 inches long, 1 inch inside diameter and ⅛ inch thickness;
(b) Electrode tube 14: length 10 inches, and ¼ inch diameter;
(c) Core member 16: 2 ⅝ inches long and 15/16 inch diameter, with a central bore of 13/16 inch diameter;
(d) Brass rod 22: 6 inches long and ¼ inch diameter;
(e) Copper tubing 26: 6 inches long and ⅛ inch diameter;
(f) Grooves 28: ⅛ inch by ⅛ inch and approximately 1/16 inch apart;

(g) Large diameter tube 32: 2 ½ inches long and ¼ inch diameter.

It is an advantage of the electrode holder 10 that it is relative lightweight and of a compact size so that it can easily be carried around in a tool box. It can further operate with a low air pressure due to the copper tubing 26.

While only a preferred embodiment of the invention has been described herein in detail, the invention is not limited thereby and modifications can be made within the scope of the attached claims.

What is claimed is:

1. A holder for an electric arc gouging electrode, comprising:
   an elongate body member having a front end and a rear end;
   an electrically conductive tube for receiving an electrode therein, located on the body member and extending longitudinally of the body member;
   air conduit means, separate from said tube, on the body member and having an air outlet at the front end of the body member which is offset from the tube and connection means located towards the rear end of the body member for connection of the air conduit means to a source of air under pressure; and
   means for connecting the tube to a source of electrical power, wherein the body member comprises a hollow substantially cylindrical sheath surrounding the tube and wherein the means for connecting the tube to a source of electrical power comprises an electrically conductive core member between the tube and the body member and an electrically conductive rod extending from the core member to the outside of the body member.

2. The holder according to claim 1, wherein the air conduit means comprises a pair of tubes extending longitudinally of the body member and terminating in outlet ends at the front end of the body member.

3. The holder according to claim 2, wherein the outlet ends of said tubes are bent towards the electrically conductive tube, the tubes having bend angles which are different from each other.

4. The holder according to claim 1, wherein the tube has a length which is greater than the length of the body member and projects from the rear end of the body member.

5. The holder according to claim 4, wherein the connection means for connecting the air conduit means to a source of gas under pressure comprises a manually operated air valve in association with a coupling member for connection to a gas cylinder.

6. The holder according to claim 1, wherein said electrically conductive core member is located at the front end of the body member.

* * * * *